United States Patent [19]

Hill

[11] Patent Number: 4,480,257

[45] Date of Patent: Oct. 30, 1984

[54] OPTICAL PRINTER COMPRISING LIGHT SWITCHING ELEMENTS

[75] Inventor: Bernhard Hill, Hamburg, Fed. Rep. of Germany

[73] Assignee: U.S. Philips Corporation, New York, N.Y.

[21] Appl. No.: 461,840

[22] Filed: Jan. 28, 1983

[30] Foreign Application Priority Data

Jun. 30, 1982 [DE] Fed. Rep. of Germany ....... 3224356

[51] Int. Cl.³ .......... G01D 9/42

[52] U.S. Cl. .......... 346/107 R; 346/108; 356/46; 356/50; 356/1

[58] Field of Search .......... 355/46, 50, 1; 346/107 R, 108

[56] References Cited

U.S. PATENT DOCUMENTS 4,258,978 3/1981 Cole .......... 355/1 X 4,364,064 12/1982 Baues .......... 355/1 X

FOREIGN PATENT DOCUMENTS 2606596 8/1977 Fed. Rep. of Germany ... 346/107 R 2812206 3/1978 Fed. Rep. of Germany ...... 346/108

*Primary Examiner*—Michael L. Gellner

*Assistant Examiner*—Della J. Rutledge

*Attorney, Agent, or Firm*—Joseph P. Abate

[57] ABSTRACT

An optical printer includes magneto-optical storage elements (light switching elements) formed on a carrier body (substrate) of comparatively small dimensions. The light switching elements LZ on the substrate T are combined so as to form groups M which are separated from one another by an equidistant space a. Each group M is associated with a self-focusing lens LS so that the distances between all image points of a plurality of groups M on a record carrier Z are equal.

6 Claims, 4 Drawing Figures

OPTICAL PRINTER COMPRISING LIGHT SWITCHING ELEMENTS

BACKGROUND OF THE INVENTION

The invention relates to an optical printer, comprising a light source, a light switching mask with light switching elements and an optical imaging system which is arranged between the light switching mask and a photo-sensitive record carrier in order to transfer a light dot raster generated in the light switching mask to the record carrier.

An optical printer of this kind is known, for example, from U.S. Pat. No. 4,278,981 and its principle is shown in FIG. 1. For the light switching mask, use is made of a row of magneto-optical light switching elements (adjacent elements being regularly, e.g. equally, distanced from one another) whose construction and operation are described in DE-OS No. 26 06 596. Other optical printing heads comprise rows of light switching elements manufactured by way of the liquid crystal technique. A further technique utilizes ceramic electro-optical materials for the construction of a light switching array.

Optical printing heads are used, for example, in electro-photographic printers for the line-wise exposure of an optically sensitive record carrier or intermediate carrier on which, subsequently, an optical image is formed by means of, for example, a photographic method or, in the case of electro-photography, by means of an electro-photographic method. Notably, electro-photographic printers are becoming increasingly more important for printing systems and office systems for the high-quality printing of text or graphic on normal paper.

Basically, an as high as possible density of electronically individually switchable light dots is desired for optical printing heads in order to increase the image quality. For the application in electro-photographic printers, the aim is for a density of at least 10 light dots per millimeter. However, in so-called laser printing heads, a resolution of up to 16 light dots per millimeter is presently achievable.

When solid state light switching masks are used, for example, as disclosed in U.S. Pat. No. 4,278,981, the desirable dot density can be achieved, but the manufacturing technique imposes a limit as regards the absolute length of a light switching row. For example, the described magneto-optical light switching masks are manufactured by means of a photolithographic masking technique. They can have a length of at the most a few centimeters. For example, light switching masks have been realized according to the magneto-optical principle which masks comprise up to 512 switching elements integrated on one carrier with a density of 16 switching elements per millimeter. Dot densities of 20 switching elements/mm can also be achieved without problems by means of the present techniques.

For the exposure of a line of DIN A4 format sheet in an optical printer, modular-like linking of several of such light switching masks comprising one row of light switching elements is then required. For example, an optical printer has been proposed in which several light switching rows are adjacently arranged, each light switching row being imaged on the record carrier by means of its own objective.

It is a drawback of such a construction of an optical printing head that the imaging distance between the object plane of the light switching mask and the image plane of the record carrier is comparatively large, because aperture and focal length are limited when use is made of separate objectives for the imaging of a line having a length of several centimeters. Typical imaging distances for the imaging of approximately 500 light dots in a 16 dot/mm raster are from 15 to 20 cm. Moreover, the diameter of the objectives must also be comparatively large in order to achieve a high aperture ratio so that as much light as possible of the object dots is intercepted. The comparatively high cost of such separate objectives is also disadvantageous.

The required imaging volume can in principle be reduced by a division into shorter light switching masks with a correspondingly larger number of imaging objectives. This is because the focal length of objectives may be chosen to be smaller when the object field to be imaged is smaller. However, it is a drawback of such a solution that the mounting costs are increased because it involves the use of a larger number of light switching masks and objectives which must all be exactly positioned with respect to one another in order to produce a gap-free and straight line of light dots on the record carrier in the image plane.

SUMMARY OF THE INVENTION

It is an object of the invention to provide an optical printer of the kind set forth in the opening paragraph, but in which, on the one hand, the lines are recorded on a substrate with an as high as possible integration degree, i.e. with a large number of dots, while on the other hand, only simple and inexpensive imaging optical systems are required with a small imaging volume.

This is achieved in accordance with the invention in that the light switching elements are arranged in a row into groups, that adjacent group are separated from one another by an equidistant intermediate space in which no light switching elements are present and which is light-impermeable, that the optical imaging system consists of a plurality of self-focusing lenses which have the same dimensions and the same imaging properties and which are arranged at equal distances from one another, and that each group of light switching elements is associated with a self-focusing lens. Preferably, adjacent light switching elements within a group are arranged at equal distances from one another.

The invention offers the advantage that, in spite of the different distances between the light switching elements dictated by the intermediate spaces between the individual element groups, a raster is obtained which exhibits the same distance between all raster dots.

The invention will be described in detail hereinafter with reference to an embodiment which is shown in the accompanying drawing Figures.

DESCRIPTION OF THE PREFERRED EMBODIMENT

Figure 1:
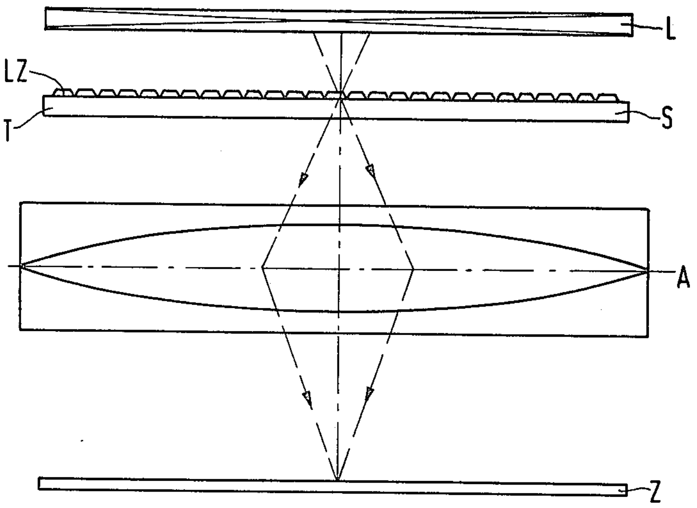
FIG. 1 diagramatically shows the basic construction of an optical printer comprising light switching elements.
Figure 4:
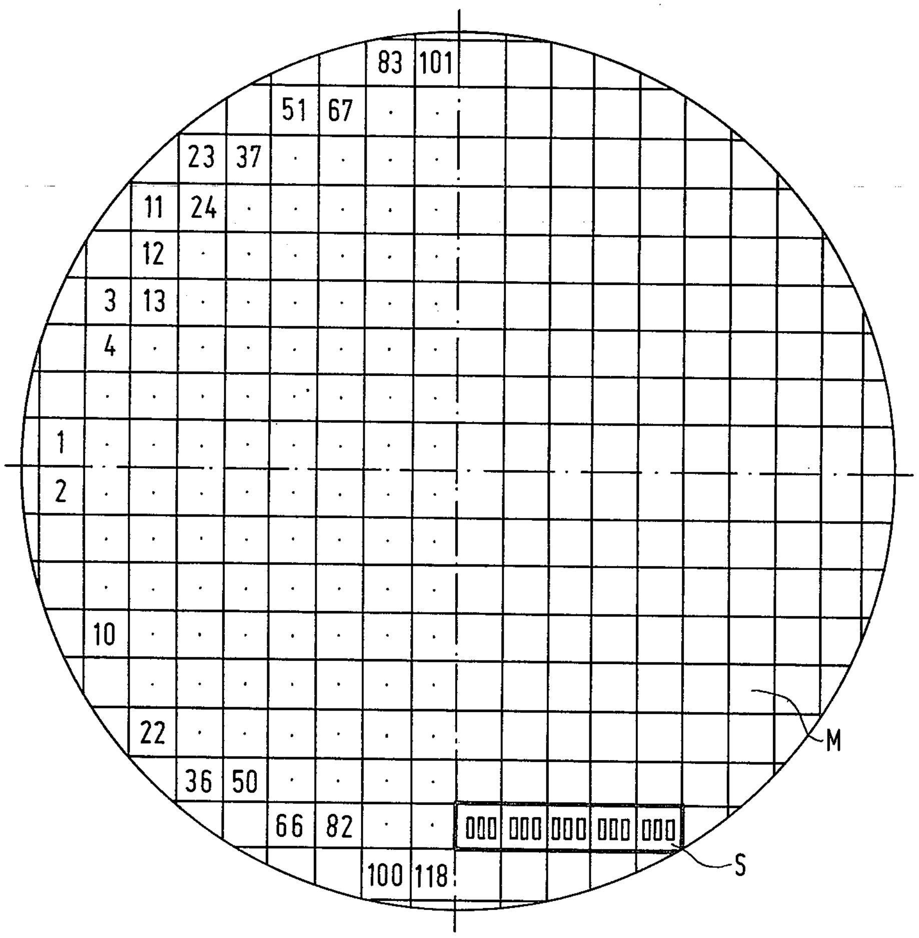
FIG. 4 is a plan view of a solid state carrier on the upper side of which there is provided a plurality of light switching elements.

FIG. 1 shows the basic construction of an optical printer. It comprises a linear light source L which is arranged in front of a light switching mask S which consists of a solid state carrier T on which there is provided a row of magneto-optical light switching elements LZ. Such a light switching mask S may be made, for example, from a round solid state disc as shown in FIG. 4 on which a number of light switching elements are formed in known manner in a pattern of squares, said disc subsequently being cut into strips along the sides of the squares.

Between the record carrier Z and the light switching mask S, there is arranged an optical imaging system A for transmitting an image pattern generated in the light switching elements LZ. The imaging system A, thus, generates a printing dot on the record carrier for each activated light switching element. The distances between these printing dots, thus, correspond to the distances between the light switching elements.

Figure 2:
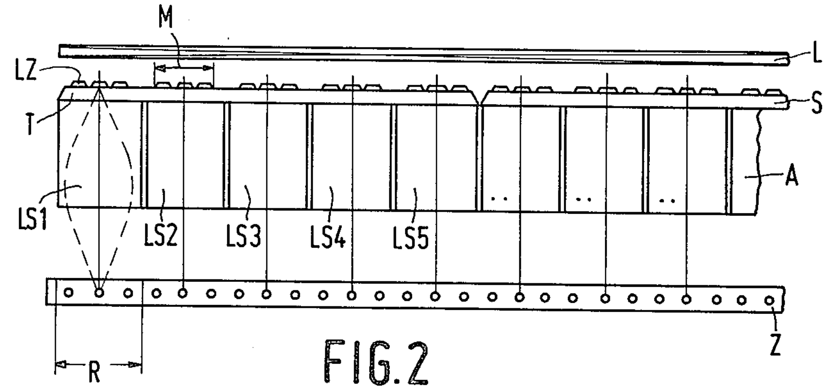
FIG. 2 is a side elevational view of the basic construction of an optical printer in accordance with the invention.
Figure 3:
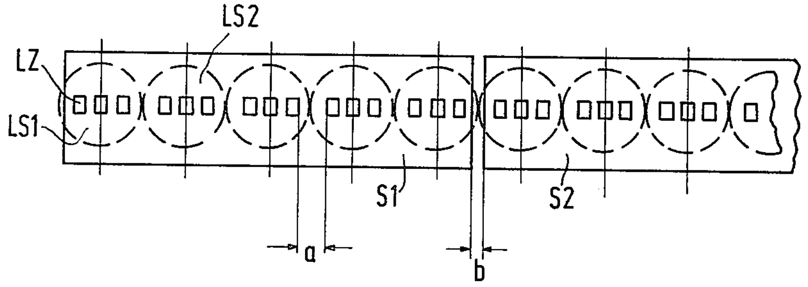
FIg. 3 is a plan view of the printer shown in FIG. 2.

The imaging system A of the optical printer shown in the FIGS. 2 and 3 utilizes self-focusing lenses or gradient lenses LS, so-called Selfoc lenses. These lenses are known per se and consist of a glass cylinder in which a concentric refractive index gradient is formed. Because of this refractive index gradient, a light-focusing effect is obtained which can be used for the imaging of light dot patterns.

A gradient lens comprises flat entrance and exit faces. The length of the lens and the value of the refractive index gradient determine the imaging properties such as, for example, the effective focal length. The lens may be proportioned so that, in a border case, the object plane is situated in the entrance plane of the lens and the image plane is situated in the exit plane, so that the beam path for the imaging is situated completely within the glass rod. Such a matrix-like or linear arrangement of a large plurality of such lenses can be manufactured as a coherent, compact component.

The arrangement shown the FIGS. 2 and 3 utilizes a coherent row of gradient lenses LS which is proportioned so that the object plane is situated in front of and at a small distance from the entrance face of the lens, said distance corresponding to the optical thickness of the carrier T of the light switching mask S. The light switching elements LZ are arranged on the surface of the carrier T. The mask S is mounted directly on the light entrance faces of the self-focusing lenses LS, preferably, by means of an adhesive. A group M of light switching elements LZ is each time arranged within the aperture of a gradient lens LS and covers a width which is smaller than the diameter of a lens. Consequently, substantially all light passing through the apertures of the light switching mask is intercepted by the lens.

A lens images the associated light dot pattern at a slightly larger scale so that, in the image plane of the lens, and hence, on the record carrier Z, a width R is covered which corresponds to the width of the lens LS. R also determined the raster dimension of the lenses LS1 to LSn. In practice, the focal length of the lenses amounts to only a few millimeters, so that a small distance is obtained between the object plane of the light switching mask S and the image plane Z.

A large number of gradient lenses LS1, LS2, etc. is adjacently arranged in accordance with the desired width of the printing head. Lenses of this kind are known per se and are used for the 1:1 imaging for the scanning in copiers. The light switching elements LZ in the light switching mask S are arranged in groups M in accordance with the lens arrangement of FIG. 2 so that the center-to-center distance of the groups M corresponds to the raster dimension R of the gradient lenses LS. The clearance a between the individual groups of light switching elements LZ which is not used determines the enlargement factor required to ensure that, in the image plane Z, the light dots imaged interconnect without gaps in order to form a row of light dots at equidistant distances.

In order to realize any arbitrary width of the printing head, several light switching masks S1, S2, etc. are adjacently arranged on the lens arrangement LS. Each light switching mask S is chosen to be as large as possible in order to minimize the number of light switching masks to be positioned with respect to one another. On the other hand, the clearance a between the groups of light switching elements LZ of a light switching mask is chosen to be so large that, when several light switching masks S1, S2, . . . are linked, the distance b of the light switching masks can be chosen so that the groups M of different light switching masks S are also arranged at the equidistant raster dimension R from one another.

For the magneto-optical light switching masks S which have been mentioned by way of example and which are cut from a larger substrate during manufacture (FIG. 4), the minimum width of the clearances a follows from the width required for the sawcut. This enables the combined formation of the groups M of many light switching masks S on a solid state disc, in accordance with FIG. 4, after which a given number of coherent groups M can be cut out as one light switching mask S, said number being chosen as the optimum from a technological point of view. Thus, the disc surface is optimally used during manufacture. Each group M forms a square on the solid state disc which is denoted by digits. Along the sides of the squares, a saw-cut can be made so that light switching masks S of different length can be manufactured.

The described construction of the optical printing head comprising said light switching masks can in principle also be used for printing heads which comprise rows of light emitting diodes (LEDs). For rows of light emitting diodes, similar manufacturing conditions exist as for the magneto-optical rows; consequently, the use of the construction in accordance with the invention enables the formation of a compact printing head consisting of individual rows of LEDs which can first be formed in combination on a semiconductor disc, after which separate rows comprising several groups are cut therefrom, each time in accordance with the required efficiency or other technological points of view.

The beam path during the imaging by a gradient lens, as shown by way of example in FIG. 2, produces a positionally inverted image of the object points of a group M. For example, when the number of light switching elements LZ of a group M amounts to 32 and the length of the group M amounts to 1.6 mm, 32 image points will be imaged on the record carrier Z, the overall length R then being 2.0 mm.

Gradient lenses can in principle also be constructed so that a two-fold image of the object points, which two-fold image comprises an intermediate image situated within the lens, is obtained. Thus, non-inverting imaging is obtained. This imaging may be advantageous for the data organization for the the light switching mask.

What is claimed is:

1. An optical printer which comprises: a light source; a light switching mask for generating a light dot raster, the mask including a carrier (T) provided with light switching elements; an optical imaging system, and a photosensitive record carrier, the imaging system being arranged between the light switching mask and the photosensitive record carrier in order to transfer the light dot raster generated in the light switching mask to the record carrier, characterized in that the light switching elements (LZ) are arranged in a row into groups (M) on the carrier (T), that adjacent groups (M) are separated by an equidistant intermediate space (a) in which no light switching elements are present and which is light-impermeable, that the optical imaging system (A) consists of a plurality of adjacently arranged self-focusing lenses (LS) which have the same dimensions and the same imaging properties, adjacent lenses being arranged at equal distances from one another, and that each group (M) of light switching elements (LZ) is associated with a self-focusing lens (LS).

2. An optical printer as claimed in claim 1, characterized in that the light switching mask (S) with the light switching elements (LZ) is mounted directly on the light entrance faces of the self-focusing lenses (LS).

3. An optical printer as claimed in the claim 1 or 2, characterized in that each self-focusing lens (LS) is of a type which produces a single, inverted image of the associated group (M) of light elements (LZ) on the record carrier (Z).

4. An optical printer as claimed in the claim 1 or 2, characterized in that each self-focusing lens (LS) is of a type which produces a two-fold image of the associated group (M) of light switching elements (LZ), the two-fold image including an intermediate image which is situated within each self-focusing lens (LS), so that a non-inverted position of the image points is obtained on the record carrier (Z).

5. An optical printer as claimed in the claim 1 or 2, characterized in that the printer further comprises a plurality of adjacently arranged light switching masks (S) and associated self-focusing lenses (LS), and that a distance (b) between a last light switching element (LZ) of a light switching mask (S1) and a first light switching element (LZ) of an adjacent light switching mask (S2) corresponds to the space (a) between the groups (M) of light switching elements (LZ).

6. An optical printer as claimed in claim 1 or 2, characterized in that the structure consisting of the light switching mask and the light source is formed by integrated rows of light-emitting diodes.

* * * * *